Patented June 16, 1942

2,286,244

UNITED STATES PATENT OFFICE 2,286,244

ASPHALT PREPARATION

Charles H. Whitacre, Cleveland, Ohio, assignor to The Standard Oil Company, Cleveland, Ohio, a corporation of Ohio No Drawing. Application December 9, 1940, Serial No. 369,319

10 Claims. (Cl. 106—232)

This invention relates to asphalt; and it is among the objects of the invention to provide asphalt having improved adhesiveness, particularly such as to readily coat aggregates which are moist or in the presence of water. Other objects and advantages will appear as the description proceeds.

To the accomplishment of the foregoing and related ends, the invention, then, comprises the features hereinafter fully described, and particularly pointed out in the claims; the following description setting forth in detail certain illustrative embodiments of the invention, these being indicative however, of but a few of the various ways in which the principle of the invention may be employed.

Asphaltic material is modified by incorporation of wood "liquid rosin," i. e. a commercial mixture of higher fatty acids and rosin acids, and a sulphate of a metal from the group of alum-forming metals aluminum and iron. The "liquid rosin" or mixture of complex fatty acids and resin acids is such as is obtained as a by-product from the conversion of pine wood into paper pulp. Acid mixtures of this character are also known under the term "tall oil." An advantageous source is the commercial preparation "liqro." Illustratively, a desirable material contains fatty acids on the average 45–55 per cent, rosin acids on the average 40–45 per cent, and higher alcohols, sterols, etc. about 6–10 per cent. The acid number is about 150–160, the rosin acids number about 76–82, the iodine number about 150–180, the saponification number about 160–170, the Saybolt Universal viscosity at 210° F. about 110–130 sec., the pour point not over about 45° F., the flash point about 350–370° F., and the fire point about 410–430° F., and the specific gravity around 0.96–0.98. The fatty acid and rosin acid mixture is thus to be clearly distinguished from abietic acid, and from wood rosin. The acid mixture is incorporated with asphaltic material at a stage as may be preferred. It may be advantageously mixed into the residuum or pipe still bottoms which are to be converted in the asphalt; or it may be mixed into the partly converted or partly oxidized asphalt, or it may be incorporated into the finished asphalt. The aluminum salt or iron salt in powdered form, for instance around 200 mesh, may be mixed into the liquid acid material or into the substantially finished asphalt for instance by stirring at a temperature at which the material is sufficiently fluid or by stirring into a cut-back containing 1–2 per cent of liquid rosin at temperatures at which the cut-back is sufficiently fluid. The acid mixture may be applied in amounts of for instance 0.5–2 per cent, and the metal salt in amounts of for instance 0.1–0.25 per cent. Illustrative of the metal salts are

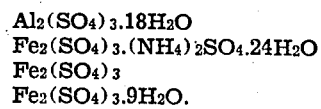

$Al_2(SO_4)_3.18H_2O$
$Fe_2(SO_4)_3.(NH_4)_2SO_4.24H_2O$
$Fe_2(SO_4)_3$
$Fe_2(SO_4)_3.9H_2O.$

Stone aggregate, as for paving for instance, when treated by admixture with 1½ parts (to each 30 parts of the aggregate) of a medium cure asphalt modified by 1 per cent of liquid rosin and 0.05 per cent of aluminum sulphate resulted in good coverage and adherence of the asphalt to the stone. With a similar treatment of aggregate with asphalt containing the same amount of liquid rosin but without the aluminum sulphate, the aggregate was not completely covered. Again, a rapid cure asphalt containing 1 per cent of liquid rosin and 0.1 per cent of aluminum sulphate gave good coverage on Ottawa sand and limestone wet and proportioned as afore-stated, but if the aluminum sulphate was omitted, all the other conditions being the same, the aggregate was only partly covered.

It is to be noticed that the present invention is entirely distinct from treating asphalt with a salt, and it involves the application of a salt with resin acids and fatty acids, and the action of the entire combination is different from that of the acids with asphalt or the action of the metal salts with asphalt, and is not in any respect a mere cumulation of the action of the acids and the action of a metal salt.

Other modes of applying the principle of the invention may be employed, change being made as regards the details described, provided the features stated in any of the following claims, or the equivalent of such, be employed.

I therefore particularly point out and distinctly claim as my invention:

1. A process of treating asphalt, which comprises incorporating with asphalt material small amounts of wood liquid rosin acids and a sulphate of a metal from the alum-forming metals aluminum and iron.

2. A process of treating asphalt, which comprises incorporating with asphalt stock small amounts of wood liquid rosin acids and fatty acid and ferric sulphate.

3. A process of treating asphalt, which comprises incorporating with asphalt stock small amounts of wood liquid rosin acids and fatty acid and aluminum sulphate.

4. A process of treating asphalt, which comprises incorporating with asphalt material small amounts of tall oil and a sulphate of a metal from the alum-forming metals aluminum and iron.

5. A process of treating asphalt, which comprises incorporating with asphalt stock small amounts of tall oil and ferric sulphate.

6. A process of treating asphalt, which comprises incorporating with asphalt stock small amounts of tall oil and aluminum sulphate.

7. Asphalt modified by small amounts of wood liquid rosin acids and fatty acids and a sulphate of a metal from the alum-forming metals aluminum and iron.

8. Asphalt modified by small amounts of tall oil and a sulphate of a metal from the alum-forming metals aluminum and iron.

9. Asphalt modified by small amounts of tall oil and ferric sulphate.

10. Asphalt modified by small amounts of tall oil and aluminum sulphate.

CHARLES H. WHITACRE.